Patented July 6, 1948

2,444,735

UNITED STATES PATENT OFFICE 2,444,735

PREPARATION OF MONOESTERS OF DICARBOXYLIC ACIDS

Hugh J. Hagemeyer, Jr., Kingsport, Tenn., assignor to Eastman Kodak Company, Rochester, N. Y., a corporation of New Jersey No Drawing. Application June 21, 1946, Serial No. 678,359

4 Claims. (Cl. 260—485)

This invention relates to the preparation of organic acid esters and more particularly to the preparation of mono esters of aliphatic dicarboxylic acids from the ester lactones formed by the condensation of a ketene with an ester of a keto acid.

An object of the invention is to provide a novel method of preparing mono acid esters of organic dicarboxylic acids of the general structure:

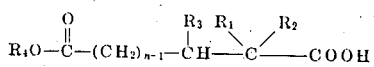

wherein $R_1$ and $R_2$ each may be hydrogen or a hydrocarbon group, $n$ is any whole number such as 1, 2, 3, 4, etc., and $R_3$ and $R_4$ may be an alkyl group, e. g., methyl, ethyl, etc., an aryl group, e. g., phenyl, benzyl, etc., and an aralkyl group, e. g., phenyl-ethyl, etc. as well as hydrogen.

Another object of the invention is to provide a method for the preparation of acid esters of dicarboxylic acids by the catalytic reduction of ester lactones formed by the condensation of a ketene with an ester of a keto acid.

A further object of the invention is to provide a method for the preparation of mono acid esters of aliphatic dicarboxylic acids which may then be hydrolyzed to the corresponding dicarboxylic acids.

In accordance with one feature of the invention, these and other objects are attained by hydrogenating, under controlled temperatures and pressures, the ester lactones formed by the condensation of a ketene with an ester of a keto acid in the presence of a hydrogenation catalyst such as Raney nickel to produce a mono ester of the corresponding dicarboxylic acids.

The invention is further illustrated in the following equation showing the hydrogenation of an ester lactone to the corresponding mono ester of a dicarboxylic acid.

The ester lactones are represented by the following general formula in which $R_1$, $R_2$, $R_3$ and $R_4$ and $n$ have the significance described above:

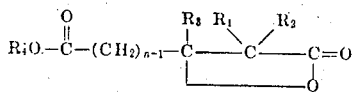

When hydrogenated the lactone group changes as shown in the following equation to a carboxyl group giving as a product a mono acid ester of aliphatic dicarboxylic acid:

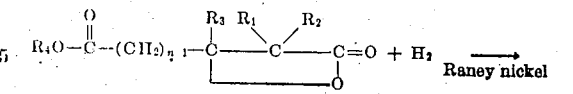

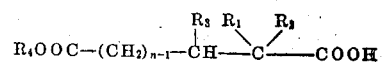

The beta lactones of keto esters may be prepared, as shown in my copending United States patent application Serial No. 675,304, filed June 7, 1946, by condensing a ketene with a keto acid ester in the presence of a Friedel-Crafts type catalyst at a temperature below 50° C. The reaction is represented by the equation,

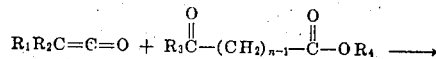

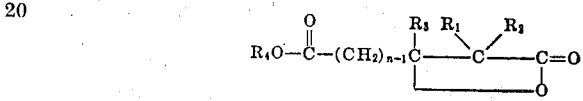

wherein $R_1$, $R_2$, $R_3$, $R_4$ and $n$ have the significance described above. The simple ketene, $CH_2=C=O$ formed by the pyrolysis of acetic acid or acetone is preferably employed as the ketene in the reaction, but its aliphatic and aromatic homologs including both aldol and keto ketenes may be employed. Desirable esters of ketoacids for the reaction include the esters of pyruvic, acetoacetic, and levulinic acids.

The hydrogenation of these ester lactones is carried out in a closed vessel such as an autoclave. The hydrogenation may be carried out in the presence of an inert diluent for the ester lactone. Inert diluents such as isopropyl ether, ethylene dichloride, carbon disulfide, carbon tetrachloride, and dioxane may be employed.

After placing the desired ester lactone in the reactor vessel, air is excluded by a current of hydrogen, and the vessel is closed. Hydrogen is advantageously admitted to the closed vessel under a pressure up to 150 atmospheres and the temperature of the vessel is maintained within a preferred range of 120-160° C. Higher pressures than 150 atmospheres may be employed, but it has been found that there is no substantial advantage in employing such high pressures. Also the temperature range at which the hydrogenation takes place may be widened, for example, from 100–200° C. and satisfactory product yields be obtained. As the hydrogen pressure in the vessel drops, owing to hydrogenation, the vessel is recharged with hydrogen gas, and this procedure is continued until no more hydrogen is absorbed. During the initial stages of the reaction, hydrogen is absorbed very rapidly, even at very low pressures. The hydrogenation is advantageously carried out in the presence of a hydrogenation catalyst, especially a nickel hydrogenation catalyst of the Raney type. The Raney nickel catalyst is prepared as shown in U. S. Patents 1,628,190 and 1,915,473 by a method of leaching aluminum out of a nickel-aluminum alloy with sodium hydroxide. While Raney nickel is the preferred catalyst for use in reducing the lactones of keto esters, other types of highly active metallic catalysts may be used, such as platinum, palladium, and nickel on kieselguhr.

The present invention, by which ester lactones are changed to mono acid esters of dicarboxylic acids, is further illustrated in the following examples:

*Example I.—Preparation of mono ethyl ester of beta-methyl glutaric acid*

Five hundred grams of ethyl acetoacetate is condensed with 168 grams of ketene in the presence of a boron fluoride ethyl ether complex catalyst in accordance with the method described in my above identified application to produce 434 grams of ester lactone. The reaction may be represented by the following equation:

H₂C=C=O + CH₃—CO—CH₂—COOC₂H₅ ⟶

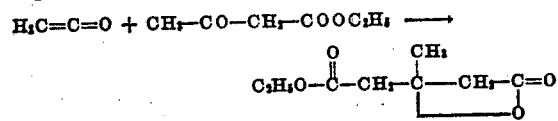

The catalyst was neutralized with a small portion of 40% NaOH and the solution was filtered to remove the neutralized catalyst.

The ester lactone is placed in a rocking autoclave and reduced with 5 grams of Raney nickel and 100 atmospheres of hydrogen at 150° C. Distillation of the resulting product at reduced pressures gave 383 grams of mono ethyl ester of beta-methyl glutaric acid B.P.₁₀ 154° C. Saponification with alkali gave an equivalent weight of 88. On hydrolysis beta-methyl glutaric acid was obtained.

*Example II.—Preparation of mono ethyl beta methyl adipic acid ester*

Five hundred grams of ethyl levulinate is condensed with 168 grams of ketene in the presence of a boron fluoride ethyl ether complex catalyst at 0° C. by the method described in my above identified patent application. At the end of the reaction, the catalyst was neutralized with 40% NaOH and filtered out of the product. The reaction may be represented by the following equation:

H₂C=C=O + CH₃CO(CH₂)₂COOH ⟶

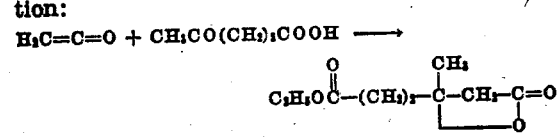

The ester lactone so produced was placed in a small stirring autoclave with 5 grams of Raney nickel and reduced with 60 atmospheres of hydrogen at a temperature of 140° C. for 20 minutes. The reaction temperature was then raised to 180° C. for 30 minutes to insure complete hydrogenation. Distillation of the hydrogenated product at reduced pressure gave 383 grams of mono ethyl beta methyl adipic acid ester, B. P.₁₀ 163–165° C. Saponification gave an equivalent weight of 94. On hydrolysis beta-methyl adipic acid was obtained.

*Example III.—Preparation of mono ester of alpha methyl succinic acid*

Five hundred grams of pyruvic ester was condensed with ketene in the presence of BF₃ etherate at 0° C. The catalyst was neutralized with 40% NaOH and filtered from the ester lactone. The reaction may be represented by the following equation:

H₂C=C=O + CH₃COCOOCH₃ ⟶ 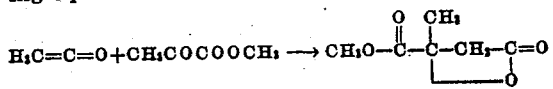

The crude ester lactone mixture was then placed in a small stirring autoclave with 5 grams Raney nickel and reduced with hydrogen at 140° C. and 60 atmospheres. The reaction temperature was raised to 180° C. for 30 minutes to insure complete reduction. Distillation at reduced pressure gave 104 grams of mono ester of alpha methyl succinic acid. Hydrolysis of this mono ester gave alpha-methyl succinic acid.

As described above, the monomeric ester lactones may be hydrogenated as such to produce mono acid esters of dicarboxylic esters. In accordance with another feature of the invention, these monomers may be partially polymerized, for example, by the methods described in United States Patent 2,361,036 of October 24, 1944, to the polyesters of the hydroxy acids and then hydrogenated to produce the product of this invention, the mono acid esters of dicarboxylic acids. This reaction may be represented by the general formula:

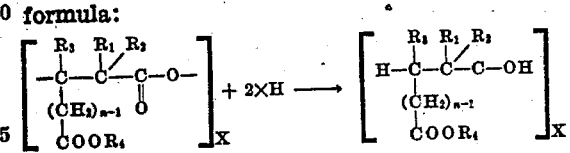

in which R and n are as described heretofore and X is any small whole number less than 6. The polymer has an advantage over the monomeric lactone in that the reduction takes place readily at lower temperatures and pressures.

The process of this invention provides a new and valuable method for the preparation of dicarboxylic acids from their mono acid esters. These dicarboxylic acids are of particular interest in the preparation of linear condensation polymers, for example, polyesters, and polyamides, of the nylon type, and other condensation polymers.

I claim:

1. The process of preparing mono acid esters of dicarboxylic acids which comprises hydrogenating, in the presence of a metallic hydrogenation catalyst selected from the group consisting of metallic platinum, metallic palladium and metallic nickel hydrogenation catalysts, an ester lactone having the general formula:

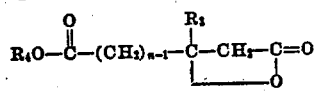

wherein R₃ represents a member selected from the class consisting of a hydrogen atom, a methyl group, an ethyl group, a phenyl group, a benzyl group and a phenylethyl group, and R₄ represents a member selected from the class consisting of a methyl group, an ethyl group, a phenyl group, a benzyl group and a phenylethyl group and $n$ is a whole number from 1 to 4.

2. The process of preparing the mono ester of alpha methyl succinic acid which comprises hydrogenating in a closed vessel in the presence of a Raney nickel catalyst a lactone having the formula:

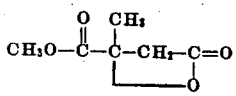

at a pressure of approximately 60 atmospheres and at a temperature of approximately 140° C.

3. The process of preparing the mono ester of beta methyl glutaric acid which comprises hydrogenating in a closed vessel in the presence of a Raney nickel hydrogenation catalyst a lactone having the formula:

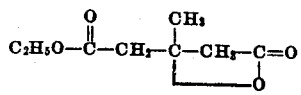

at a pressure of approximately 100 atmospheres and at a temperature of approximately 150° C.

4. The process of preparing the mono ester of beta methyl adipic acid which comprises hydrogenating in a closed vessel in the presence of a Raney nickel hydrogenation catalyst a lactone having the formula:

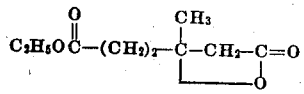

at a pressure of approximately 60 atmospheres and a temperature of approximately 140° C.

HUGH J. HAGEMEYER, Jr.

REFERENCES CITED

The following references are of record in the file of this patent:

Jacobs et al., "Jour. Biol. Chem.," vol. 87 (1930), pp. 601–613.

Jacobs et al., "Jour. Biol. Chem.," vol. 93 (1931), pp. 139–152.